Patented Oct. 10, 1950

2,524,792

UNITED STATES PATENT OFFICE 2,524,792

PROCESS FOR SOLUBILIZING ALLYL STARCH

Robert M. Hamilton, Clinton, Iowa, and Elias Yanovsky, Philadelphia, Pa., assignors to United States of America as represented by the Secretary of Agriculture No Drawing. Application July 11, 1947, Serial No. 760,486

6 Claims. (Cl. 260—233.3)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a process of preparing allyl ethers of starch. Among its objects is the provision of improved methods for producing organic solvent soluble allyl starch.

Peter L. Nichols, Philip E. Meiss, and Elias Yanovsky, in their U. S. Patent No. 2,413,463 dated December 31, 1946, have described a process for producing allyl starch which is soluble in organic solvents. They prepare it by reacting starch with an allylating agent in the presence of concentrated aqueous alkali and an organic solvent for allyl starch.

The process described in the aforementioned patent requires heating of the reaction mixture for a considerable length of time in order to effect solubilization of the product formed by interaction of starch with the allylating agent.

We have found that solubilization of allylated starch occurs much more readily in a medium having an acid reaction.

We have also found that the allylation reaction is facilitated by the presence of a small amount of alkali iodide as a catalyst.

In one aspect of our invention, organic solvent soluble allyl starch is produced by the following procedure: Starch is allylated by reacting it with an allylating agent in the presence of concentrated aqueous alkali and organic solvent, as described in the aforementioned patent. Or it may be allylated in the absence of organic solvent, as disclosed by Eugene A. Talley and Elias Yanovsky in the application for patent, Serial No. 760,487 filed July 11, 1947.

Upon completion of the allylation process, the resultant allylated starch is solubilized by contacting it with an organic solvent medium at a pH of less than 7, and preferably at pH of about 2 to 3. Organic solvent soluble allyl starch can then be recovered from the solution thus obtained by any suitable means; for example, by steam distilling the solution to remove the solvent and separating the allyl starch precipitate from the aqueous portion of the distillation residue by decantation or by filtering.

Any organic solvent capable of dissolving allyl starch can be used in the solubilization process. Suitable solvents include, for example, alcohols, such as methyl, ethyl, propyl, or butyl alcohol; aromatic hydrocarbons, such as benzene, toluene, xylene; chlorobenzenes and other chlorinated aromatic hydrocarbons; ketones, such as acetone or methyl ethyl ketone; esters, such as ethyl acetate or butyl acetate; dioxane and other similar solvents for allyl starch which may be used either singly or in combination.

Hydrochloric acid, sulfuric acid, or phosphoric, or any other acid or acidic compound may be used to acidify the solubilization medium, and the process is preferably conducted with heating since the rate of solubilization increases with the temperature.

The method of this invention is applicable to the production of organic solvent soluble allyl starch obtained by allylating any native starch, such as corn, potato, and wheat starches, and modified starches, such as thin boiling starches, dextrins, and oxidized starches. By our process the duration of the solubilization step is reducible to but a fraction of that required in processes utilized heretofore.

The following example illustrates the prior art process:

Example 1

Starch was allylated by the method described in U. S. Patent No. 2,413,463 as follows:

A mixture consisting of 750 grams of potato starch (air-dry material containing approximately 13% moisture), 700 grams of 50% aqueous sodium hydroxide solution, 1110 grams of allyl bromide, and 1500 cc. methyl ethyl ketone was refluxed for 33 hours at 80° C. The solution thus obtained was steam distilled to remove solvent and excess of allyl bromide, and the gummy distillation residue was washed salt-free with water. The resulting product consisted of organic solvent soluble allyl starch containing 1.8 allyl groups per glucose unit.

The following examples illustrate our invention:

Example 2

The mixture of starch, sodium hydroxide solution, allyl bromide, and ketone described in Example 1 was refluxed at 80° until it acquired a substantially neutral reaction, which occurred after a period of 7 hours. The mixture was then acidified by an addition of 20 cc. concentrated hydrochloric acid. On further refluxing at the same temperature, a solution was formed within one hour following the addition of acid. Allyl starch was recovered from this solution as described in the foregoing example, and was found to be identical with the product of Example 1.

The yield also was substantially the same and amounted to about 90% of the theoretical.

Example 3

A mixture consisting of 875 grams of corn starch, 980 grams of 50% aqueous sodium hydroxide, 985 grams of allyl chloride, and 3-5 liters of acetone was heated for about 10 hours at 90° C. in an autoclave. The nearly neutral mixture was then acidified with 60 cc. of concentrated hydrochloric acid, and after heating for another hour at 90° a solution was obtained. Allyl starch was isolated as described in Example 1. The properties and yield of this product were similar to those obtained in the foregoing examples.

Example 4

The procedure of Example 3 was repeated using the following two mixtures:

(a)

875 g. starch
490 g. sodium hydroxide
245 g. water
985 g. allyl chloride
9 g. sodium iodide
4 liters acetone (b)

875 g. starch
980 g. 50% aqueous sodium hydroxide solution
985 g. allyl chloride
9 g. sodium iodide
4 liters acetone The allyl starch so obtained contained between 1.8 to 2.0 allyl groups per glucose unit. Similar results were obtained using methyl ethyl ketone, toluene, or dioxane instead of acetone.

Example 5

Starch was allylated in the absence of an organic solvent using the procedure described by Eugene A. Talley and Elias Yanovsky in their application for patent Serial No. 760,487 filed July 11, 1947, as follows:

A mixture consisting of 800 grams of corn starch, 980 grams of 50% aqueous solution of sodium hydroxide, and 985 grams of allyl chloride was heated for about 4 hours at 90° C. At the end of this time the pH of the mixture was about 7-8.

Four liters of acetone were then added and the batch acidified to a pH of about 2-3 by adding 55 cc. of concentrated hydrochloric acid, and the heating continued for an additional 45 minutes. The allyl starch recovered from the resulting solution by the above-described procedure contained 1.6 allyl groups per glucose unit.

In following the same procedure, but omitting addition of acid, heating at 90° C. for a period of about 30 hours following the addition of the solvent was required to bring the allyl starch in solution.

Example 6

A mixture consisting of 980 grams of 50% aqueous solution of sodium hydroxide, 800 grams of corn starch, 8 grams of sodium iodide, and 985 grams of allyl chloride was heated at 90° C. for 4 hours. Then 4 liters of acetone and 70 cc. of concentrated hydrochloric acid were added and heating continued for another hour. The allyl starch so produced contained 1.65 allyl groups per glucose unit.

Example 7

A mixture consisting of 245 grams of water, 490 grams of sodium hydroxide, 800 grams of corn starch, 8 grams of sodium iodide, and 985 grams of allyl chloride was heated at 90° C. for 4½ hours. Then 3500 cc. of toluene and 80 cc. of concentrated hydrochloric acid were added, and the heating continued for another hour and a half. The allyl starch so produced contained 1.7 allyl groups per glucose unit.

Example 8

A mixture consisting of 1080 grams of 50% aqueous solution of sodium hydroxide, 800 grams of potato starch, 8 grams of sodium iodide, and 985 grams of allyl chloride was heated at 90° C. for 3½ hours and then for 30 minutes with 4 liters of acetone and 120 cc. of concentrated hydrochloric acid. The allyl starch so produced contained 1.6 allyl groups per glucose unit.

Example 9

To facilitate stirring of the batch 500 cc. of acetone was added to a mixture consisting of 980 grams of 50% aqueous sodium hydroxide solution, 800 grams of potato starch, 8 grams of sodium iodide, and 985 grams of allyl chloride. The batch was then heated at 90° C. for 5½ hours, and then for 15 minutes longer following the addition of 3 liters of acetone and 35 cc. of concentrated hydrochloric acid. The allyl starch recovered from the resulting solution contained 1.7 allyl groups per glucose unit.

Example 10

A mixture consisting of 245 grams of water, 490 grams of sodium hydroxide, 800 grams of potato starch, 8 grams of sodium iodide, 985 grams of allyl chloride, and 500 cc. of acetone was heated at 90° C. for 5 hours and then for 15 minutes longer following the addition of 3 liters of acetone and 50 cc. of concentrated hydrochloric acid. The allyl starch so produced contained 1.8 allyl groups per glucose unit.

The yields of solvent soluble allyl starch obtained by procedures described in Examples 4 to 10 inclusive were from 80 to 90 per cent of the theoretical yield.

Similar results were also obtained using procedures analogous to those described in the foregoing examples when other solvents for allyl starch were used.

Equivalent amounts of potassium hydroxide and potassium iodide can be used instead of the sodium compounds.

While the preferred temperature range in the allylation step and in the treatment with acidic organic solvent is 70 to 110° C., operation outside of this range is within the broader purview of our teaching, in the light of which skilled operators may readily adjust the temperature and duration to obtain the best results.

Having described our invention, we claim:

1. A process of preparing organic solvent soluble allyl starch comprising allylating starch in the presence of aqueous alkaline solution and an organic solvent, and acidifying the reaction mixture in the pH range 2 to 3, and heating the acidified reaction mixture in the range 70° to 110° C.

2. The process described in claim 1 in which the starch is allylated by reacting with an allyl halide, in the presence of aqueous alkali metal hydroxide.

3. The process of allylating starch comprising reacting starch with allyl chloride in the presence of concentrated aqueous alkali, an organic solvent, and a minor amount of alkali metal iodide.

4. A process of allylating starch comprising heating starch with an allyl halide of the group consisting of the chloride and bromide in the presence of concentrated aqueous alkali, an organic solvent, and an amount of alkali metal iodide minor with respect to the allyl halide.

5. A process of preparing organic solvent soluble allyl starch comprising: allylating starch by heating starch with allyl chloride in the presence of aqueous alkali metal hydroxide, an organic solvent, and a minor amount of alkali metal iodide; acidifying the reaction mixture in the pH range 2 to 3, and heating the acidified reaction mixture in the range 70° to 110° C.

6. The process of allylating starch comprising reacting starch with allyl bromide in the presence of concentrated aqueous alkali, an organic solvent, and alkali metal iodide in an amount minor with respect to the allyl bromide.

ROBERT M. HAMILTON.
ELIAS YANOVSKY.

REFERENCES CITED

The following references are of record in the file of this patent:

UNITED STATES PATENTS

| Number | Name | Date |
|---|---|---|
| 1,350,820 | Lilienfeld | Aug. 24, 1920 |
| 1,767,382 | Leuchs | June 24, 1930 |
| 2,398,767 | Burke | Apr. 23, 1946 |
| 2,413,463 | Nichols et al. | Dec. 31, 1946 |